(No Model.)
J. R. HARE.
ELECTRIC CONDUCTOR.
No. 539,222. Patented May 14, 1895.
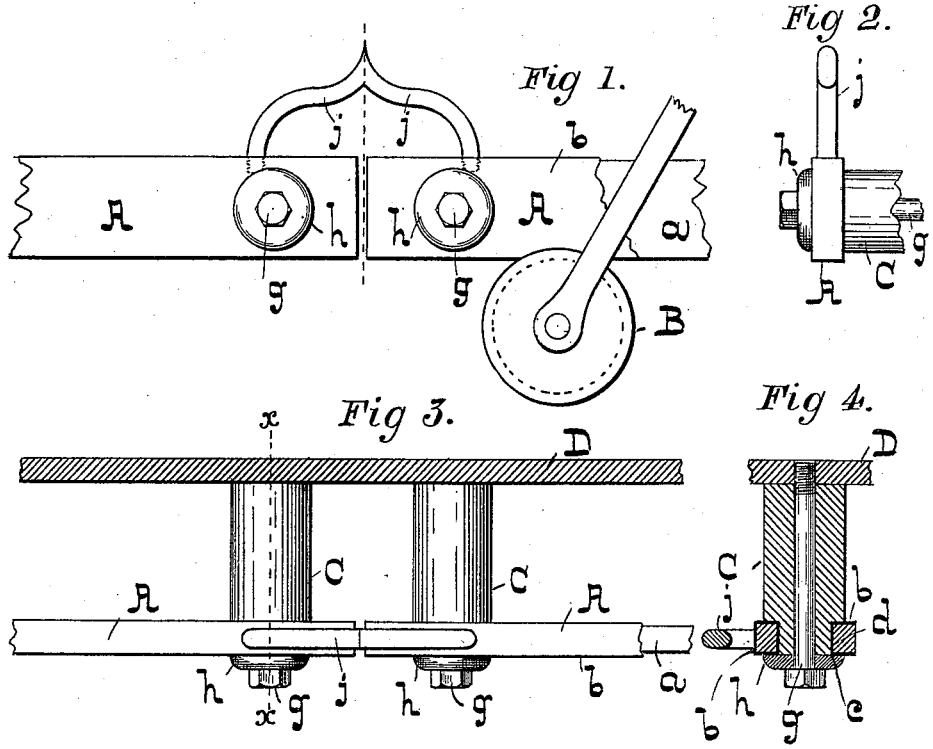
WITNESSES —
Dan'l Fisher
George Hemsley
INVENTOR —
John R. Hare,
by G. W. T. Maid
atty.

UNITED STATES PATENT OFFICE.

JOHN R. HARE, OF BALTIMORE, MARYLAND.

ELECTRIC CONDUCTOR.

SPECIFICATION forming part of Letters Patent No. 539,222, dated May 14, 1895.

Application filed November 23, 1894. Serial No. 529,688. (No model.)

*To all whom it may concern:*

Be it known that I, JOHN R. HARE, of the city of Baltimore and State of Maryland, have invented certain Improvements in Insulated Electric Conductors, of which the following is a specification.

The object of the present invention is to protect the electric conductors used in underground systems of electric car propulsion, from loss of electricity through the agency of moist or humid air which surrounds them; and it consists in providing the portion of the conductor which does not come in contact with the trolley wheel, with a coating of some vitreous substance, as will hereinafter fully appear.

In the description of the said invention which follows, reference is made to the accompanying drawings, forming a part hereof, in which—

Figure 1 is a side view of the adjacent ends of two bars forming a part of an electric conductor in an underground conduit embodying the present invention; and Fig. 2, an end view of one of the said bars together with certain parts of the devices which are employed to unite the said bars with the conduit, which is not shown. Fig. 3 is a top view of Fig. 1, together with a portion of one side of the conduit and the fastening devices; and Fig. 4, a section of the same, taken on the dotted line $x\ x$, as will hereinafter appear.

Referring now to Figs. 1 to 4, inclusive, A A are two sections of the electric conductor, consisting of metallic bars $a$ of rectangular cross section, having three sides and their ends covered with a coating of glass or some analogous vitreous substance which is denoted by $b$. In the present case the top edge, the sides and ends are so covered, the lower edge with which the trolley wheel B comes in contact being exposed. Near to their ends, the bars $a$ are provided with holes $c$ and the surfaces $d$ around the holes are coated with the glass, see Fig. 4, the same as are the sides.

The vitreous coating is applied to the three surfaces of the metal conductor, in the form of a paste, and the actual union of the two substances is effected by heat which melts the glass and causes it to flow uniformly over the surface of the metal to be coated.

C C are studs of any suitable material which serve to connect the conductors A with the conduit, a portion only of which is shown in Figs. 3 and 4, and denoted by D. These studs are reduced in diameter at one end so that they may enter the holes $c$ in the bars $a$, and they are secured to the side of the conduit by means of bolts $g$ which pass through them. Between the heads of the bolts and the conducting bar, is a washer $h$. By this connection, the studs are insulated from the metallic portion of the conductors, as the studs and the holding bolts come in contact only with the vitreous coating.

The conductors A are electrically connected by means of metallic rods $j$ which are screwed into the bars $a$ and soldered together. These rods are affixed to the bars before the coating operation and the whole are coated except the ends of the rods which have to be soldered together.

In order that there may be some elasticity in the connection between the bars $a$, the rods $j$ are made curved as shown.

In Fig. 4 the conductor is shown as a round bar, and the coating $b$ extends only partially around it, the exposed portion being of sufficient extent to allow of the proper application of the trolley wheel.

I claim as my invention—

1. An electrical conductor for the purpose described, formed in separated sections which are electrically connected by rods which project from one side or edge, each section consisting of a bar of practically rectangular cross section with its sides, one edge and its ends covered with some vitreous substance, substantially as specified.

2. In an electrical conductor for the purpose described, a series of separated bars of practically rectangular cross section, having their sides, one edge and their ends covered with some vitreous substance, the said bars having holes which extend transversely through them for holding bolts, the surface around the said holes being also covered with the said vitreous substance, substantially as specified.

3. In an electrical conductor for the purpose described, a series of separated bars coated at the sides and one edge and at their ends with some vitreous substance, and electrically connected by rods which extend laterally from them and are electrically united, substantially as specified.

JOHN R. HARE.

Witnesses:
　WM. T. HOWARD,
　DANL. FISHER.